Aug. 7, 1928.

C. E. COTTIN 1,679,853

SPRINGING OF MOTOR VEHICLES

Filed Oct. 8, 1926

Witnesses

Inventor

Cyrille Edouard Cottin

Patented Aug. 7, 1928.

1,679,853

UNITED STATES PATENT OFFICE.

CYRILLE EDOUARD COTTIN, OF LYON, FRANCE, ASSIGNOR TO AUTOMOBILES COTTIN & DESGOUTTES, SOCIETE ANONYME, OF LYON, FRANCE.

SPRINGING OF MOTOR VEHICLES.

Application filed October 8, 1926, Serial No. 140,330, and in France November 27, 1925.

This invention relates to improvements in the springing of motor vehicles.

In the motor car industry the mounting of the wheels to obtain a suitable interconnection between the wheels, springs and chassis gives rise to a multiplicity of pivotal connections. This results in a large amount of friction and rapid wear.

According to the present invention, which is applicable to both rear and front springing, there is only employed one pivot and one oscillating slide for each wheel.

The invention consists essentially in an arrangement for pivotally mounting the hubs by pivot pins at the lower extremity carrying a transverse spring affixed at its center to the chassis and rods on the upper portions sliding in ball or other bearings in arms rigidly affixed to the chassis.

This system can be equally well applied to either the front or back of the vehicle without a supporting axle and ensures the independence of steering or driving wheels without the employment of levers or pivoted cranks.

The invention will be described with reference to the accompanying drawings.

Figure 1:
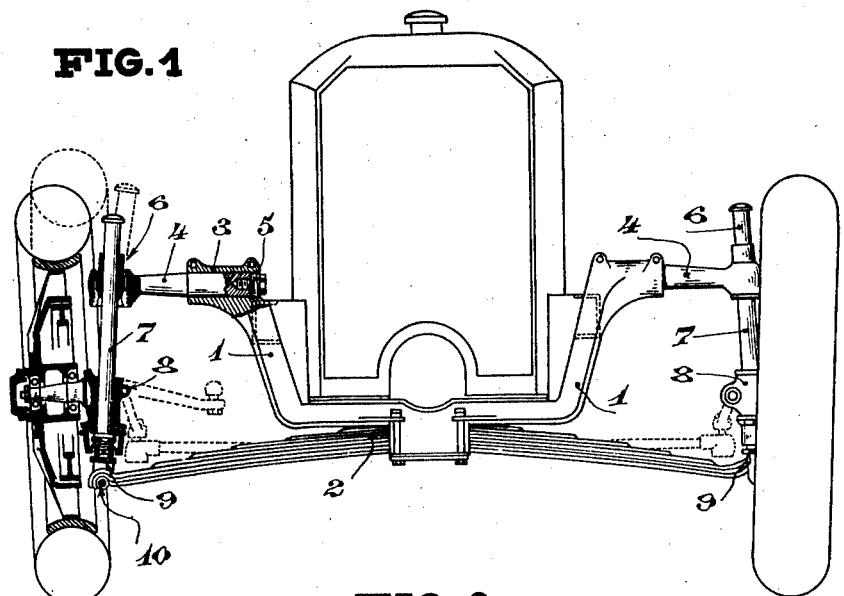
Fig. 1 is a transverse view partly in section of the arrangement applied to the front or steering wheels.

Between the front ends of the side members of the chassis a cross member 1 is mounted, which supports the engine and to the underside of which a transverse spring 2 is affixed.

The member 1 is formed at its ends with brackets 3 arranged to receive arms 4 of a fixed length or of variable length adjustable by screw pins 5 or by other suitable means. Each arm terminates in a head in which is housed a ball and socket universal joint on a sleeve 6 in which slides a guide rod 7, or other similar arrangement.

The guide rods 7 serving as pivot pins for the stub-axle brackets 8 are rigidly connected by means of a screw portion 21 and a pin to a bracket 9 mounted on a rod 10 carried by the transverse spring 2.

The rods 7 are provided with a collar 19 disposed between ball-bearings 18 and the under side of the brackets 8, said ball-bearings 18 being supported respectively by means of a box 17 screwed on the upper end of the brackets 8, said box transmitting the vertical stress acting on the stub axle, to the corresponding ball-bearing 18, the collar 19 and the spring 2. By means of this arrangement the bracket 8 may rotate freely on the guide rod 7 and is prevented from sliding axially in the one and the other direction on said rod. Of course, the collar 19 and the ball-bearing 18 could be disposed at the upper end 20 of the bracket 8.

The guide rod 7 which supports the stub axle passes through the sleeve of the joint 6 at its upper end and at its lower describes a curve according to the variations in the compression of the spring 2.

This arrangement allows the stub axle a resultant movement but ordinary steering arms can be employed without the wheels having undue play.

This resultant movement takes place as below described along an arc of large radius. In order to arrange this curvature suitably the arms 4 are adjusted by the studs 5, which allows for the spreading or coming together of the centers of the sleeves 6 which varies the inclination of the wheels with respect to the vehicle.

Similarly to allow the steering arm to move during running the wheels can be given a suitable inclination.

The spring should carry part of the force due to braking and shocks whilst the rest is taken by the arms 4.

During running the distance between the stub axle and the sleeve 6 varies thus subjecting the arm 4 to a bending action due to the wheels adhering to the ground when braking or shocks.

The amplitude of the movement due to shocks may be limited by stops arranged on the guides 7 at either side of the sleeve 6.

Figure 2:
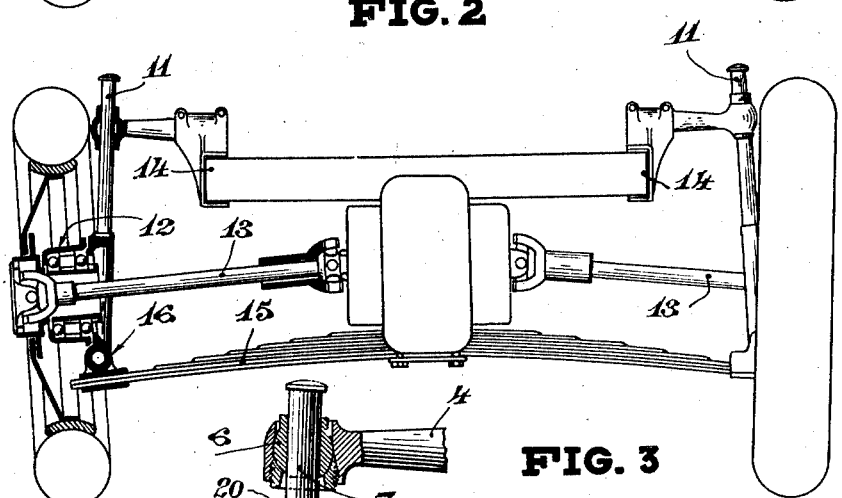
Fig. 2 is a similar view of the arrangement applied to the driving wheels.
Figure 3:
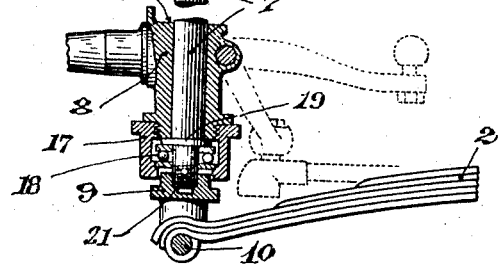
Fig. 3 is a vertical section of part of Fig. 1.

The application of the arrangement to the driving wheels is shown in Fig. 2 in which the slides 11 are suitable for affixing to a bearing box 12 leaving room for the passage of a driving shaft 13 which connects the differential to the wheel. The upper end of the guide 11 slides in an oscillating sleeve at the end of a stationary shaft, either adjustable or not, carried by the chassis 14.

The lower ends of the guides 11 are pivoted to the ends of a transverse spring 15 but the shackle and pin 16 should be of sufficient size to insure the spring keeping the wheels parallel.

This suspension, the essential parts of which have been described may be altered in detail.

Known shock absorbing arrangements may also be added without departing from the principle.

Having now particularly described and ascertained the nature of my said invention and in what manner the same is to be performed, I claim:

1. A transverse spring suspension applicable to the driving or steering wheels of motor vehicles, comprising a spring, guide rods connected to said spring, axle members for the wheels mounted on said guide rods and arms arranged to be carried by the chassis, and to which said guide rods are connected for sliding movement and also for universal angular movement, said arms being adjustable to vary the extent of the space between the upper portions of the guide rods.

2. A spring suspension means for motor vehicles comprising in combination, a cross-member mounted on a vehicle frame and provided at its ends with vertical oscillating sleeves, a transverse spring underlying and supporting said cross-member and provided at its ends with oscillating bearings, guide rods respectively engaged freely at their upper end in said sleeves and connected rigidly at their lower end to said bearings, said guide rods serving as pivot pins, bearing brackets of the stub axles mounted on said rods, said bearing brackets being pivotally mounted respectively on the guide rods between said sleeves and said bearings, and means for preventing axial sliding of said bearing brackets relatively to said guide rods.

3. A spring suspension means for motor vehicles comprising in combination, a cross-member mounted on a vehicle frame and provided at its ends with arms, vertical universal swinging sleeves supported on said arms, a transverse spring underlying and supporting said cross-member and provided at its ends with oscillating bearings, guide rods respectively engaged freely at their upper ends in said sleeves and connected rigidly at their lower end to said bearings, said guide rods serving respectively as pivot pins for bearing brackets of the stub-axles and means for varying the length of said sleeve supporting arms.

In witness whereof I affix my signature.

CYRILLE EDOUARD COTTIN.